United States Patent
Jia et al.

(10) Patent No.: US 10,361,898 B2
(45) Date of Patent: Jul. 23, 2019

(54) COMPLEXITY REDUCTION FOR OFDM SIGNAL TRANSMISSIONS

(71) Applicant: Huawei Technologies Co., Ltd., Shenzhen (CN)

(72) Inventors: Ming Jia, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 33 days.

(21) Appl. No.: 15/461,963

(22) Filed: Mar. 17, 2017

(65) Prior Publication Data
US 2018/0054341 A1   Feb. 22, 2018

Related U.S. Application Data

(60) Provisional application No. 62/377,568, filed on Aug. 20, 2016.

(51) Int. Cl.
*H04L 27/26* (2006.01)
*H04L 25/03* (2006.01)
*H04W 72/04* (2009.01)

(52) U.S. Cl.
CPC .... *H04L 27/2626* (2013.01); *H04L 25/03828* (2013.01); *H04W 72/044* (2013.01)

(58) Field of Classification Search
CPC .............. H04L 27/2626; H04L 27/2647; H04L 25/03828; H04W 72/04
USPC ........................................................ 375/260
See application file for complete search history.

(56) References Cited

U.S. PATENT DOCUMENTS

| | | | |
|---|---|---|---|
| 9,137,074 B2 | 9/2015 | Vilaipornsawai et al. | |
| 9,419,770 B2 | 8/2016 | Abdoli et al. | |
| 2007/0160159 A1* | 7/2007 | Song ................... | H04L 25/0232 375/260 |
| 2010/0008310 A1* | 1/2010 | Gerstenberger .... | H04L 27/2608 370/329 |
| 2014/0192848 A1* | 7/2014 | Rao ........................... | H04L 5/00 375/219 |
| 2014/0213206 A1* | 7/2014 | Morris ...................... | H03F 3/24 455/226.1 |
| 2015/0172086 A1* | 6/2015 | Khoshgard ......... | H04L 27/2646 375/260 |

(Continued)

FOREIGN PATENT DOCUMENTS

| | | |
|---|---|---|
| CN | 104823402 A | 8/2015 |
| CN | 104854806 A | 8/2015 |
| WO | 2015120814 A1 | 8/2015 |

OTHER PUBLICATIONS

Huawei, et al. "OFDM Based Flexible Waveform for 5G", 3GPP TSG RAN WG1 Meeting #84bis, R1-162152, Apr. 11-15, 2016, 10pgs, Busan, Korea.

(Continued)

*Primary Examiner* — Kevin M Burd
(74) *Attorney, Agent, or Firm* — Slater Matsil, LLP

(57) ABSTRACT

An OFDM signal may include a first edge band signal corresponding to a first edge band of the bandwidth of the OFDM signal, a second edge band signal corresponding to a second edge band of the bandwidth, and a center band signal corresponding to a center band of the bandwidth. The OFDM signal may be filtered by filtering the first edge band signal and/or the second edge band signal, so that out-of-band radiation of the OFDM may be reduced or eliminated.

22 Claims, 6 Drawing Sheets

(56) References Cited

U.S. PATENT DOCUMENTS

| | | | |
|---|---|---|---|
| 2015/0208403 A1* | 7/2015 | Takeda | H04L 1/00 |
| | | | 370/329 |
| 2015/0349981 A1* | 12/2015 | Tang | H04L 25/0204 |
| | | | 375/260 |
| 2015/0349996 A1 | 12/2015 | Vilaipornsawai et al. | |
| 2016/0065275 A1* | 3/2016 | Reuven | H04B 7/0413 |
| | | | 375/267 |
| 2016/0094329 A1 | 3/2016 | Abdoli et al. | |
| 2016/0192353 A1 | 6/2016 | Abdoli et al. | |
| 2016/0248616 A1 | 8/2016 | Vilaipornsawai et al. | |
| 2016/0269212 A1 | 9/2016 | Vilaipornsawai et al. | |
| 2017/0264476 A1 | 9/2017 | Yang et al. | |
| 2019/0028192 A1* | 1/2019 | Tsonev | H04B 10/116 |

OTHER PUBLICATIONS

"Considerations on Waveform Design for new RAT", Spreadtrum Communications, 3GPP TSG RAN WG1 Meeting #84 bis, R1-162548, Apr. 11-15, 2016, 2 pgs, Busan, Korea.

* cited by examiner ered signal of the OFDM signal. The method also includes
COMPLEXITY REDUCTION FOR OFDM SIGNAL TRANSMISSIONS This patent application claims priority to U.S. Provisional Application No. 62/377,568, filed on Aug. 20, 2016 and entitled "COMPLEXITY REDUCTION FOR OFDM SIGNAL TRANSMISSIONS," which is hereby incorporated by reference herein as if reproduced in its entirety.

TECHNICAL FIELD

The present invention relates generally to telecommunications, and in particular embodiments, to techniques and mechanisms for complexity reduction in OFDM signal transmissions.

BACKGROUND

Orthogonal frequency division multiplexing (OFDM) is a multi-carrier modulation technique that has been widely used in communications systems, such as broadband multicarrier communications systems. It has many advantages such as high spectral efficiency, resiliency to radio frequency (RF) interference, lower multi-path distortion, and high bit rates. However, OFDM suffers high out-of-band (OOB) radiation due to the use of square pulses on subcarriers, which prohibits efficient use of spectrum. It is desirable to develop systems and methods that reduce or avoid the OOB radiation in OFDM systems.

SUMMARY OF THE INVENTION

Technical advantages are generally achieved, by embodiments of this disclosure which describe to techniques and mechanisms for complexity reduction in OFDM transmissions.

In accordance with an embodiment, a method for wireless transmission is provided. In this example, the method includes performing, by a device, a filtering operation on a first edge band signal of an orthogonal frequency-division multiplexing (OFDM) signal, thereby generating a first filtered edge band signal. A bandwidth of the OFDM signal includes a first edge frequency band, a second edge frequency band and a center frequency band between the first edge frequency band and the second edge frequency band, and the OFDM signal includes the first edge band signal corresponding to the first edge frequency band and a center band signal corresponding to the center frequency band. The method further includes performing, by the device, a time windowing operation on the center band signal, thereby generating a time-windowed center band signal, and transmitting, by the device, a signal including the first filtered edge band signal and the time-windowed center band signal to one or more receivers. A device for performing this method is also provided.

In accordance with another embodiment, a method for wireless transmission is provided. In this example, the method includes receiving, by a device, a first signal comprising a transmitted signal of an orthogonal frequency-division multiplexing (OFDM) signal that is transmitted by a transmitter. The transmitted signal includes a first filtered edge band signal and a time-windowed center band signal of the OFDM signal. The first filtered edge band signal corresponds to a first edge band of a bandwidth of the OFDM signal, and the time-windowed center band signal corresponds to a center band of the bandwidth of the OFDM signal. The center band is positioned between the first edge band and a second edge band of the bandwidth of the OFDM signal. The method further includes performing a filtering operation on the received first signal to obtain the transmitted signal of the OFDM signal. The method also includes performing a down-sampling operation on the first filtered edge band signal in the obtained transmitted signal, thereby generating a first down-sampled edge band signal. The first filtered edge band signal is sampled at a sampling rate that is less than a sampling rate of the OFDM signal. The method further includes performing a fast Fourier transform (FFT) operation on the first down-sampled edge band signal.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

It has been know that orthogonal frequency division multiplexing (OFDM) signals suffer high out-of-band (OOB) radiation. Filtering may be applied to an OFDM signal to reduce the OOB radiation. Because complexity of the filtering depends on the bandwidth of the OFDM signal that is to be filtered, filtering OFDM signals with greater bandwidth requires higher filtering complexity.

Aspects of this disclosure provide a method for reducing the complexity of filtering OFDM signals in order to reduce OOB radiation of the OFDM signals. Specifically, an OFDM signal is filtered by filtering a portion of the OFDM signal, instead of the entire OFDM signal. Because the portion of the OFDM signal occupies a less bandwidth than the OFDM signal, the complexity for filtering the OFDM signal is decreased. The portion of the OFDM signal may be filtered so that side lobes of the OFDM signal that is outside of an allocated bandwidth is reduced or eliminated. Embodiments of this disclosure provide a scheme that allows opportunistic radio communications and improves spectral efficiency for synchronous/asynchronous communications.

In one embodiment, the bandwidth of an OFDM signal is divided into a first edge frequency band, a second edge frequency band and a center frequency band positioned between the first edge frequency band and the second edge frequency band. The OFDM signal is correspondingly divided into a first edge band signal corresponding to the first edge frequency band, a second edge band signal corresponding to the second edge frequency band, and a center band signal corresponding to the center frequency. A filtering operation may be performed on the first and/or the second edge band signal of the OFDM signal, and a time windowing operation may be performed on the center band signal of the OFDM signal.

Figure 1:
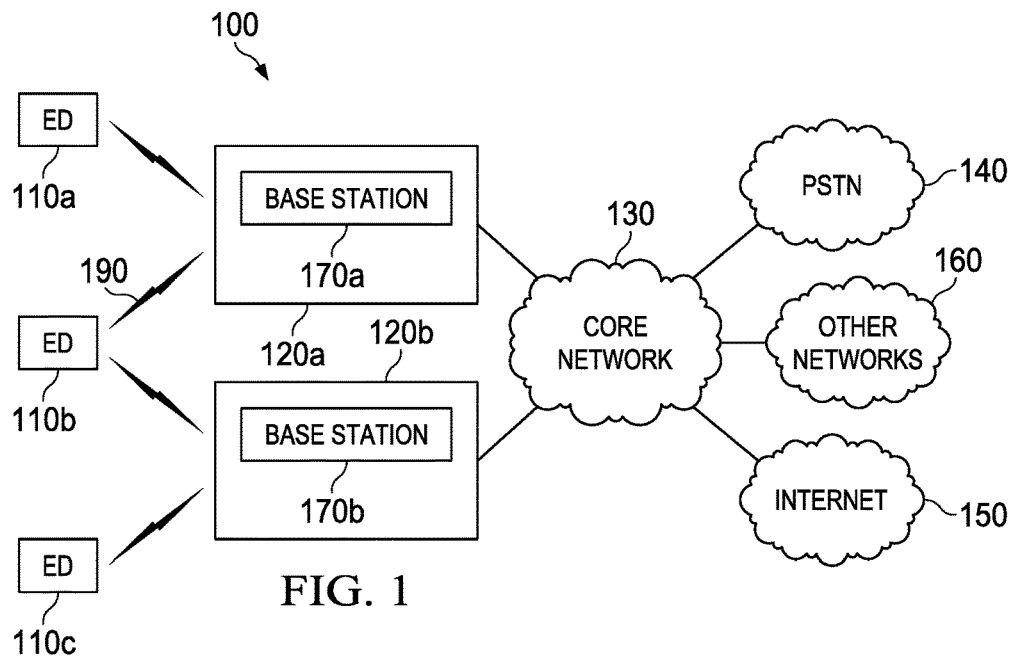
FIG. 1 illustrates a diagram of an embodiment communication system.

FIG. 1 illustrates an embodiment communication system 100. In general, the system 100 enables multiple wireless or wired users to transmit and receive data and other contents. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA). The communication system 100 may be implemented according to long term evolution (LTE), LTE advanced (LTE-A), and/or LTE broadcast (LTE-B). Other multiple access schemes and wireless protocols may also be utilized.

In this example, the communication system 100 includes electronic devices (ED) 110a-110c, radio access networks (RANs) 120a-120b, a core network 130, a public switched telephone network (PSTN) 140, Internet 150, and other networks 160. While certain numbers of these components or elements are shown in FIG. 1, any number of these components or elements may be included in the communication system 100.

The EDs 110a-110c are configured to operate and/or communicate in the system 100. For example, the EDs 110a-110c are configured to transmit and/or receive via wireless or wired communication channels. Each ED 110a-110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device. As shown, the EDs 110a-110c are configured to interface and communicate with the Internet 150 and may access the core network 130, the PSTN 140, and/or the other networks 160.

The RANs 120a-120b include base stations 170a-170b, respectively. The base stations 170a-170b establish uplink and/or downlink connections with the EDs 110a-110c, respectively, and serve to carry data from the EDs 110a-110c to the base stations 170a-170b and vice-versa. Data carried over the uplink/downlink connections may include data communicated between the EDs 110a-110c, as well as data communicated to/from a remote-end (not shown) by way of a backhaul network. As shown, each base station 170a-170b is configured to wirelessly interface with one or more of the EDs 110a-110c to enable access to the core network 130, the PSTN 140, the Internet 150, and/or the other networks 160. The base stations 170a-170b may communicate with one or more of the EDs 110a-110c over one or more air interfaces 190 using wireless communication links. The air interfaces 190 may utilize any suitable radio access technology. The base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc.

In the embodiment shown in FIG. 1, the base station 170a forms part of the RAN 120a, which may include other base stations, elements, and/or devices. The base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed when a cell has multiple transceivers.

The RANs 120a-120b are in communication with the core network 130 to provide the EDs 110a-110c with voice, data, application, Voice over Internet Protocol (VoIP), or other services. The RANs 120a-120b and/or the core network 130 may be in direct or indirect communication with one or more other RANs (not shown). The core network 130 may also serve as a gateway access for networks, such as the PSTN 140, the Internet 150, and the other networks 160. In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or a switch (not shown), and to the Internet 150.

Although FIG. 1 illustrates one example of a communication system, various changes may be made to FIG. 1. For example, the communication system 100 may include any number of EDs, base stations, networks, or other components/elements in any suitable configuration.

Figure 2:
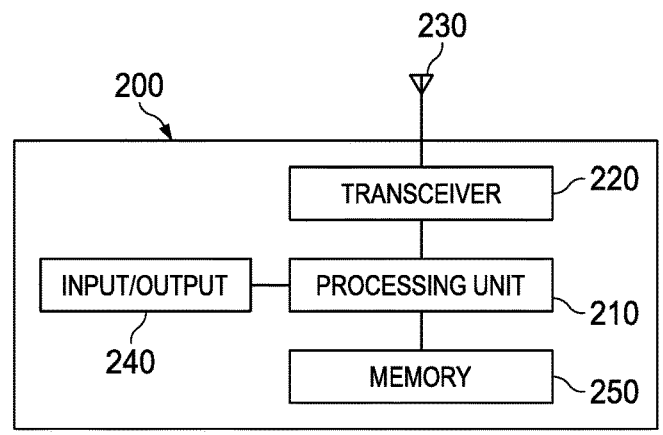
FIG. 2 illustrates a diagram of an embodiment electronic device.

FIG. 2 illustrates an embodiment ED 200. The ED 200 may be used to implement an ED 110a-110c in the communication system 100 of FIG. 1 or in any other suitable system. As shown, the ED 200 includes at least one processing unit 210. The processing unit 210 implements various processing operations of the ED 200. For example, the processing unit 210 may perform signal coding, data processing, power control, input/output processing, or any other functionality enabling the ED 200 to operate in a communication system, such as the communication system 100. The processing unit 210 also supports the methods and teachings described above in FIG. 1. Each processing unit 210 includes any suitable processing or computing device configured to perform one or more operations. Each processing unit 210 may, for example, include a microprocessor, microcontroller, digital signal processor, field programmable gate array, or application specific integrated circuit.

The ED 200 also includes at least one transceiver 220. The transceiver 220 is configured to modulate data or other content for transmission by at least one antenna or network interface controller (NIC) 230. The transceiver 220 is also configured to demodulate data or other content received by the at least one antenna 230. Each transceiver 220 includes any suitable structure for generating signals for wireless or wired transmissions and/or for processing signals received wirelessly or by wire. Each antenna 230 includes any suitable structure for transmitting and/or receiving wireless or wired signals. One or more transceivers 220 may be used in the ED 200, and one or more antennas 230 may be used in the ED 200. Although illustrated as a single functional unit, the transceiver 220 may also be implemented using at least one transmitter and at least one separate receiver.

The ED 200 further includes one or more input/output devices 240 or interfaces (such as a wired interface to Internet). The input/output devices 240 facilitate interaction with a user or other devices (for network communications) in the network. Each input/output device 240 includes any suitable structure for providing information to or receiving/providing information from a user, using a device such as a speaker, microphone, keypad, keyboard, display, or touch screen, for network communications, including network interface communications.

In addition, the ED 200 includes at least one memory 250. The memory 250 stores instructions and data used, generated, or collected by the ED 200. For example, the memory 250 may store software or firmware instructions executed by the processing unit(s) 210 and data used to reduce or eliminate interference in incoming signals. Each memory 250 includes any suitable volatile and/or non-volatile storage and retrieval device(s). Any suitable type of memory may be used, such as a random access memory (RAM), read only memory (ROM), hard disk, optical disc, subscriber identity module (SIM) card, memory stick, secure digital (SD) memory card, and the like.

Figure 3:
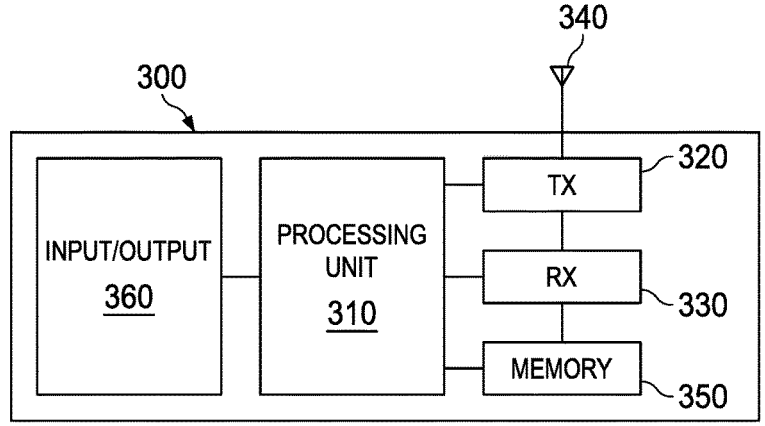
FIG. 3 illustrates a diagram of an embodiment base station.

FIG. 3 illustrates an embodiment base station 300. The base station 300 may be used to implement a base station in FIG. 1. As shown in FIG. 3, the base station 300 includes at least one processing unit 310, at least one transmitter 320, at least one receiver 330, one or more antennas 340, at least one memory 350, and one or more input/output devices or interfaces 360. A scheduler may be coupled to the processing unit 310. The scheduler may be included within or operated separately from the base station 300. The processing unit 310 implements various processing operations of the base station 300, such as signal coding, data processing, power control, input/output processing, or any other functionality. The processing unit 310 may also support the methods and teachings described above with respect to FIG. 1. Each processing unit 310 includes any suitable processing or computing device configured to perform one or more operations. Each processing unit 310 may, for example, include a microprocessor, microcontroller, digital signal processor, field programmable gate array, or application specific integrated circuit.

Each transmitter 320 includes any suitable structure for generating signals for wireless or wired transmissions to one or more EDs or other devices. Each receiver 330 includes any suitable structure for processing signals received wirelessly or by wire from one or more EDs or other devices. Although shown as separate components, at least one transmitter 320 and at least one receiver 330 may be combined into a transceiver. Each antenna 340 includes any suitable structure for transmitting and/or receiving wireless or wired signals. While a common antenna 340 is shown here as being coupled to both the transmitter 320 and the receiver 330, one or more antennas 340 may be coupled to the transmitter(s) 320, and one or more separate antennas 340 may be coupled to the receiver(s) 330. Each memory 350 includes any suitable volatile and/or non-volatile storage and retrieval device(s). Each input/output device 360 facilitates interaction with a user or other devices (for network communications) in a network. Each input/output device 360 includes any suitable structure for providing information to or receiving/providing information from a user for network communications, including network interface communications.

Additional details regarding the ED 200 and the base station 300 are well-known to those of ordinary skill in the art. As such, these details are omitted here for clarity.

When OFDM schemes are used in the system 100 for communications, out-of-band (OOB) radiation due to high side lobes of modulated subcarriers may result in high inference between channels and reduced efficiency of spectrum use. In some embodiments, guard bands may be used to reduce or avoid such interferences caused by the OOB radiation; however, guard bands are generally not used to transmit data in OFDM schemes, which also reduces spectral efficiency.

Alternatively, a filtered OFDM (f-OFDM) scheme may be used to reduce the OOB radiation of OFDM signals. An OFDM signal herein refers to a signal carrying a data sequence modulated onto a set of OFDM time-frequency resources, such as a resource block (RB), or a set of subcarriers. A RB is a set of resource elements. Each resource element corresponds to a specific subcarrier in a specific OFDM symbol. For example, a RB in LTE is defined as 12 consecutive subcarriers in 14 consecutive OFDM symbols, i.e., a set of 12×14=168 resource elements. The F-OFDM scheme is a scheme in which a filtering operation is applied to a sequence of OFDM symbols, and the filtering operation may be designed to reduce side lobes of modulated subcarriers. A filtered OFDM signal may be referred to as an "f-OFDM signal". It would be appreciated that the term "f-OFDM signal" may refer to any filtered OFDM signal. An f-OFDM scheme has benefits of OFDM, e.g., simple equalization, channel estimation, and suitability for MIMO transmissions.

To generate an f-OFDM signal with reduced OOB radiation, an OFDM signal may be filtered to attenuate side-lobes of the OFDM signal that are positioned outside an allocated bandwidth for transmitting the OFDM signal. This enables data to be transmitted over essentially the entire allocated bandwidth, without relying on a guard band to mitigate interference between adjacent channels. The filter that is used to generate an f-OFDM signal is referred to as an "f-OFDM filter" throughout this disclosure.

Complexity of an f-OFDM filter for reducing OOB radiation of an OFDM signal is influenced by an overall bandwidth of the OFDM signal. The complexity of an f-OFDM filter may be indicated generally by the number of taps of the f-OFDM filter. The number of taps further depends on a sampling rate of a to-be-filtered OFDM signal. Because the sampling rate (represented by "fs") of a signal should be at least twice the bandwidth of the signal to satisfy the Nyquist criterion, i.e., the bandwidth of the signal should be equal to or less than ½ fs cycles/second (Hertz), an f-OFDM filter will have more taps for filtering higher bandwidth signals that requires a higher sampling rate. Thus, the greater the bandwidth of an OFDM signal is, the higher the complexity of an f-OFDM filter for filtering the OFDM signal.

In some embodiments, complexity of filtering an OFDM signal may be reduced by filtering a portion of an OFDM signal, instead of the entire OFDM signal. When the portion of the OFDM signal occupies a less bandwidth than the OFDM signal, the filtering complexity is decreased because the portion allows using a sampling rate less than what is required for sampling the entire OFDM signal.

In some embodiments, the bandwidth of an OFDM signal may be viewed as including multiple portions. A portion may be processed separately from other portions. For example, the bandwidth of the OFDM signal may include three frequency bands, i.e., a first edge frequency band positioned at one edge of the bandwidth, a second edge frequency band positioned at the other edge of the bandwidth, and a third frequency band positioned between the first edge frequency band and the second edge frequency band. The third frequency band is herein referred to as a center frequency band for it is located between two edge frequency bands. However, the center frequency band does not need to be exactly in the center of the bandwidth of the OFDM signal. The three frequency bands may have the same numerology. The bandwidth of the first edge frequency band and the second edge frequency band may be the same as or different than each other. Corresponding to the third frequency bands, the OFDM signal includes three portions or signals, i.e., a first edge band signal corresponding to the first edge frequency band, a second edge band signal corresponding to the second edge frequency band, and a center band signal corresponding to the center frequency band.

The OFDM signal may be filtered by filtering the first edge band signal, the second edge band signal, or both, to reduce OOB radiation of the OFDM signal. An edge band signal may be filtered separately from other portions of the OFDM signal. An f-OFDM filter for filtering an edge band signal may be designed so that side lobes of the edge band signal, consequently the OFDM signal, that is outside of a bandwidth allocated to the OFDM signal may be attenuated, e.g., by a pre-defined percentage. The f-OFDM filter may also be designed so that interference between adjacent channels is reduced, or according to other criteria for reducing the OOB radiation of the OFDM signal. The f-OFDM filter may be designed so that a filtered edge band signal has a very steep spectrum roll-off (i.e., transition band).

Figure 4:
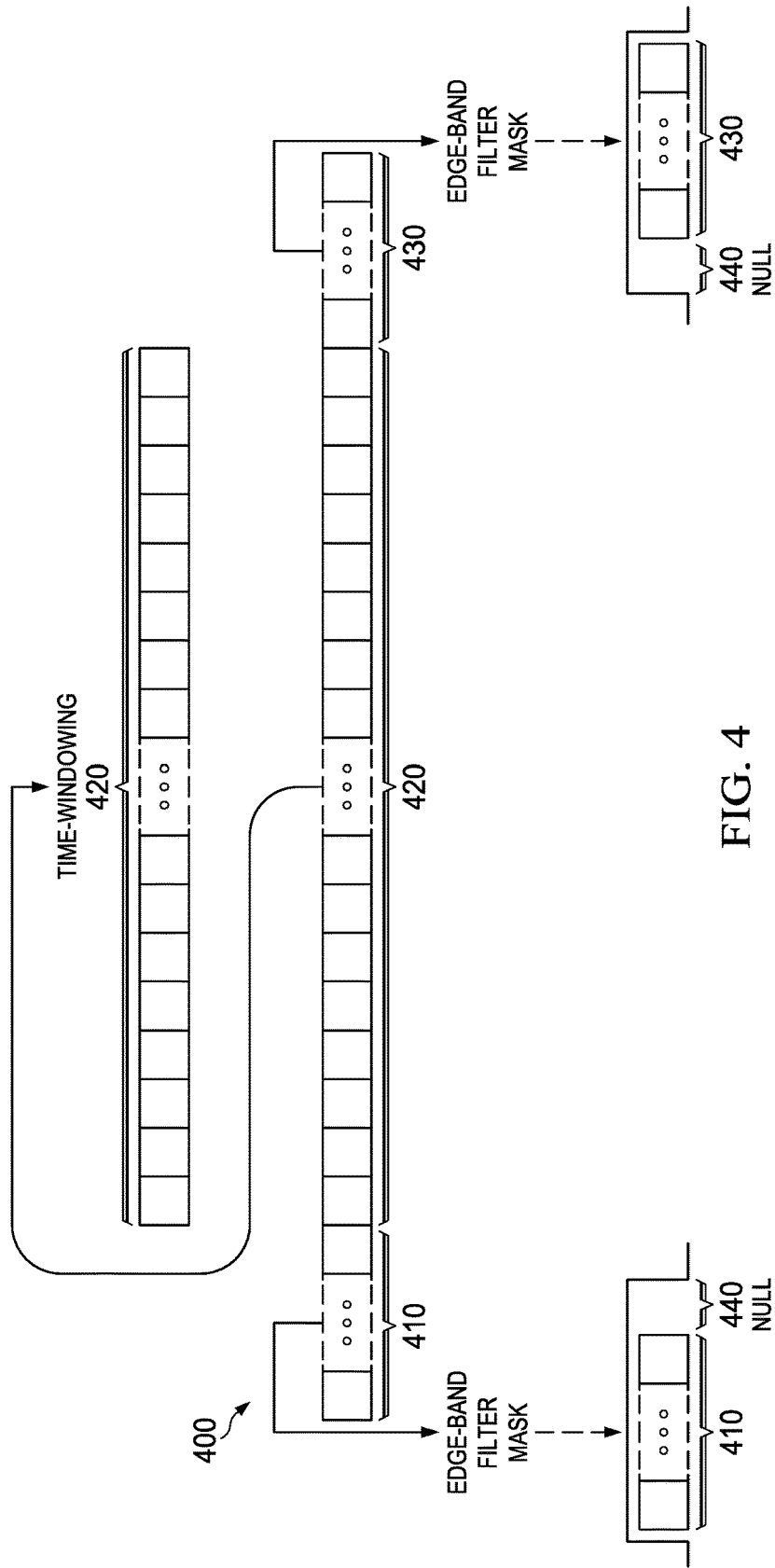
FIG. 4 illustrates a diagram of an embodiment orthogonal frequency division multiplexing (OFDM) signal in the frequency domain.

FIG. 4 illustrates an embodiment OFDM signal 400 in the frequency domain. The OFDM signal 400 may be a subband signal or a system band signal. The OFDM signal 400 includes an edge band signal 410 corresponding to a first edge band, an edge band signal 430 corresponding to a second edge band and a center band signal 420 corresponding to a third frequency band, e.g., a center band. As shown, the center band signal 420 is positioned in-between the edge band signals 410, 430 in the frequency domain. One or both of the edge band signals 410, 430 may be filtered, e.g., using an f-OFDM filter, to attenuate side lobes of the edge band signals 410, 430 that are positioned outside an allocated bandwidth of the OFDM signal 400.

A time windowing operation may also be performed on the center band signal 420. The time windowing operation may function to smooth symbols of the OFDM signal 400, and also reduce side lobes of the OFDM signal 400. Alternatively, a filtering operation may be applied to the center band signal 420 to reduce side lobes of the OFDM signal 400. The time windowing operation or the filtering operation is used to reduce stopband leakage levels. An edge band corresponding to the edge band signal 410 or the edge band signals 430 may be viewed as a "guard band" for the center band signal 420. Thus, a smaller window can be used for performing the time windowing operation on the center band signal 420, compared with a window for performing a time windowing operation on the entire OFDM signal 400. This may achieve a relatively small inter-symbol interference (ISI) effect, even for large delay spread channels. Similarly, a short filter (i.e., a filter with less number of taps) may be used to filter the center band signal 420.

To perform a time windowing operation on the center band signal 420, in one embodiment, the center band signal 420 may be transformed from the frequency domain to the time domain using an inverse fast Fourier transform (IFFT) performed on the center band signal 420. Cyclic prefixes (CPs) may then be added to symbols in the center band signal 420 in the time domain, and the time windowing operation is performed on the center band signal 420 with added CPs in the time domain, generating a time-windowed center band signal.

The resulting filtered edge band signals and time-windowed center band signal may be transmitted to one or more receivers. In one example, prior to the transmission, the filtered edge band signals and the time-windowed center band signal may be combined into a to-be-transmitted OFDM signal, where they are aligned in the frequency domain the same as the edge band signal 410, the edge band signal 430 and the center band signal 420 prior to the filtering and timing windowing operations. That is, the combined signals are aligned in the same spectrum as the edge band signals 410, 430 and the center band signal 420.

To filter an edge band signal, in one embodiment, an IFFT may be performed on the edge band signal 410 or 430 to transform the edge band signal 410 or 430 from the frequency domain to the time domain. CPs may be added to symbols in the edge band signal 410 or 430 in the time domain. The edge band signal 410 or 430 with added CPs may then be filtered to attenuate outer-most side lobes of the edge band signal 410 or 430, generating a filtered edge band signal.

In some embodiments, the edge band signal 410 or 430 may be filtered using a filter at a sampling rate that is less than a sampling rate threshold. The filter may be a high-order filter, and attenuates outer-most side lobes of the edge band signal(s) positioned outside a bandwidth allocated for the OFDM signal 400. In one example, the sampling rate threshold may be a number of samples per second that is less than twice the bandwidth of the OFDM signal 400 in Hertz. In another example, the sampling rate threshold may be a number of samples per second that is less than twice the bandwidth of the center band signal 420 in Hertz. Other applicable sampling rate threshold may also apply. The filter for filtering the edge band signal 410 or 430 may be centered on the frequency band of the edge band signal 410 or 430, and the bandwidth of the filter may be the same as or greater than the frequency band of the edge band signal 410 or 430. The output of the filter is a filtered edge band signal 410 or a filtered edge band signal 430.

An up-sampling operation may then be performed on the filtered edge band signal 410 or the filtered edge band signal 430, generating an up-sampled filtered edge band signal. By using the up-sampling operation, the filtered edge band signal 410 or 430 is sampled at a sampling rate required for sampling the OFDM signal 400 according to the Nyquist sampling criterion. The up-sampling operation places the filtered edge band signal 410 or 430 to a spectrum of the original edge band signal 410 or 430 before the previous filtering operation. The up-sampling operation may be performed by inserting zeros between consecutive symbols in the filtered edge band signal 410 or 430, and then passing the zero-inserted symbols through a low-pass filter.

In some embodiments, each of the edge band signal 410, 430 is filtered for reducing or eliminating side lobes of the edge band signal 410, 430, and then each of the filtered edge band signal 410, 430 is processed by performing an up-sampling operation and a low-pass filtering. The processed filtered edge band signal 410, 430 and the time-windowed center band signal 420 are combined to generate a filtered OFDM signal and transmitted.

In a case where the edge band signal 410 is zero, i.e., there is no signal corresponding to the first edge band of the OFDM signal 400, only the edge band signal 430 may be filtered. The filtered edge band signal 430 and the time-windowed center band signal 420 are then combined into a filtered OFDM signal and transmitted. Alternatively, each of the edge band signal 410, 430 is filtered, regardless of whether an edge band signal 410, 430 is zero or not.

A filtered OFDM signal including a combination of one or two filtered edge band signals and a time-windowed center band signal may be transmitted without including any guard bands. Alternatively, the filtered OFDM signal may include one or more guard bands. Because the filtered OFDM signal has reduced or eliminated side lobes, shorter guard bands may be used, guard bands that are used may occupy less bandwidth of the filtered OFDM signal, and thus spectrum use efficiency is improved.

When the filtered OFDM signal is received at a receiver side, e.g., by a receiver, different portions of the filtered OFDM signal may also be processed separately. In one embodiment, each of the two filtered edge band signals may be processed at a lower sampling rate than the sampling rate used for sampling the filtered OFDM signal. This helps reduce processing complexity at the receiver side. For example, each of the two filtered edge band signals may be processed by performing an FFT operation at a lower sampling rate. An FFT operation may be performed on the time-windowed center band signal at the sampling rate used for sampling the filtered OFDM signal. The filtered edge band signals and the time-windowed center band signal, after being processed separately, may then be combined and demodulated, resulting in a sequence of data carried by the filtered OFDM signal.

The edge band signal 410 and/or the edge band signal 430 may include any number of RBs. In one embodiment, the edge band signal 410 or the edge band signal 430 include exactly three RBs. In another embodiment, the edge band signal 410 or the edge band signal 430 include exactly four RBs. In yet another embodiment, the edge band signal 410 or the edge band signal 430 include exactly five RBs. In an embodiment, a pass-band filter may be applied to filter the edge band signal 410 and/or the edge band signal 430, and the pass-band filter may have an edge band filter mask that is at least one RB wider than the number of RBs included in the edge band signal 410 or 430. The pass-band filter may also have an additional null guard-band 440.

In an example where the OFDM signal 400 has a 20 MHz bandwidth, if a filter is used to filter the entire OFDM signal 400 and each OFDM symbol has 2048 samples, the filter may have 1025 taps. In contrast, when only the edge band signal 410 or 430, instead of the entire OFDM signal 400, is filtered, in a case when the edge band signal 410 or 430 includes four RBs, each OFDM symbol in the edge band signal 410 or 430 may include 128 samples, and the filter may only have approximately 65 taps. In this case, the filtering of the edge band signal 410 or 430 may be implemented in the time domain with a 256 times multiplication. The filtered edge band signal 410 or 430 may then be up-sampled such that each OFDM symbol includes 2048 samples, which is the same as the original OFDM symbol, and filtered by a lower-order filter, such as a filter including approximately 80 taps. In this example, the up-sampling ratio is 16 (i.e., 2048/128=16), which means that 15 zeros are placed between two non-zero samples. Thus, by filtering an edge band signal of an OFDM signal instead of the entire OFDM signal, the number of taps of the filter is greatly decreased, and consequently the filtering complexity is reduced.

As discussed above, filtering of an OFDM signal may be performed with reduced complexity by filtering one or more edge band signals of the OFDM signal. In according to one embodiment, filtering an edge band signal of the OFDM signal may be implemented by filtering the edge band signal using an f-OFDM filter at a sampling rate less than a threshold, up-sampling the filtered edge band signal using an up-sampling filter, and performing ($N_{FFT}+N_{CP}$) complex multiplications (i.e., for implementing low-pass filtering) after the up-sampling operation. Thus, filtering of the edge band signal requires much lower complexity than filtering the OFDM signal, which may be a wideband signal. The up-sampling operation and the complex multiplications help move the filtered edge band signal to its original position in the frequency domain. $N_{FFT}$ is the number of points for performing fast Fourier transform (FFT), and $N_{CP}$ is the length of a cyclic prefix inserted in an OFDM symbol. The f-OFDM filter may be a low sampling-rate filter that filters the edge band signal at a sampling rate less than a sampling rate threshold. For example, the sampling rate threshold may be the sampling rate for sampling the OFDM signal 400 or the center band signal 420. The f-OFDM filter may be designed to attenuate side lobes of the edge band signal of the OFDM signal. The up-sampling filter also affects the filtering complexity; however, it requires less complexity than the f-OFDM filter. In some embodiments, the f-OFDM filter may be designed to have a pre-determined bandwidth regardless of the bandwidths of the to-be-filtered OFDM signals. In this case, the f-OFDM filter may have a module structure with a fixed bandwidth for filtering. In other embodiments, the f-OFDM filter may have a bandwidth that is adjustable according to the to-be-filtered OFDM signals or other applicable factors.

Figure 5:
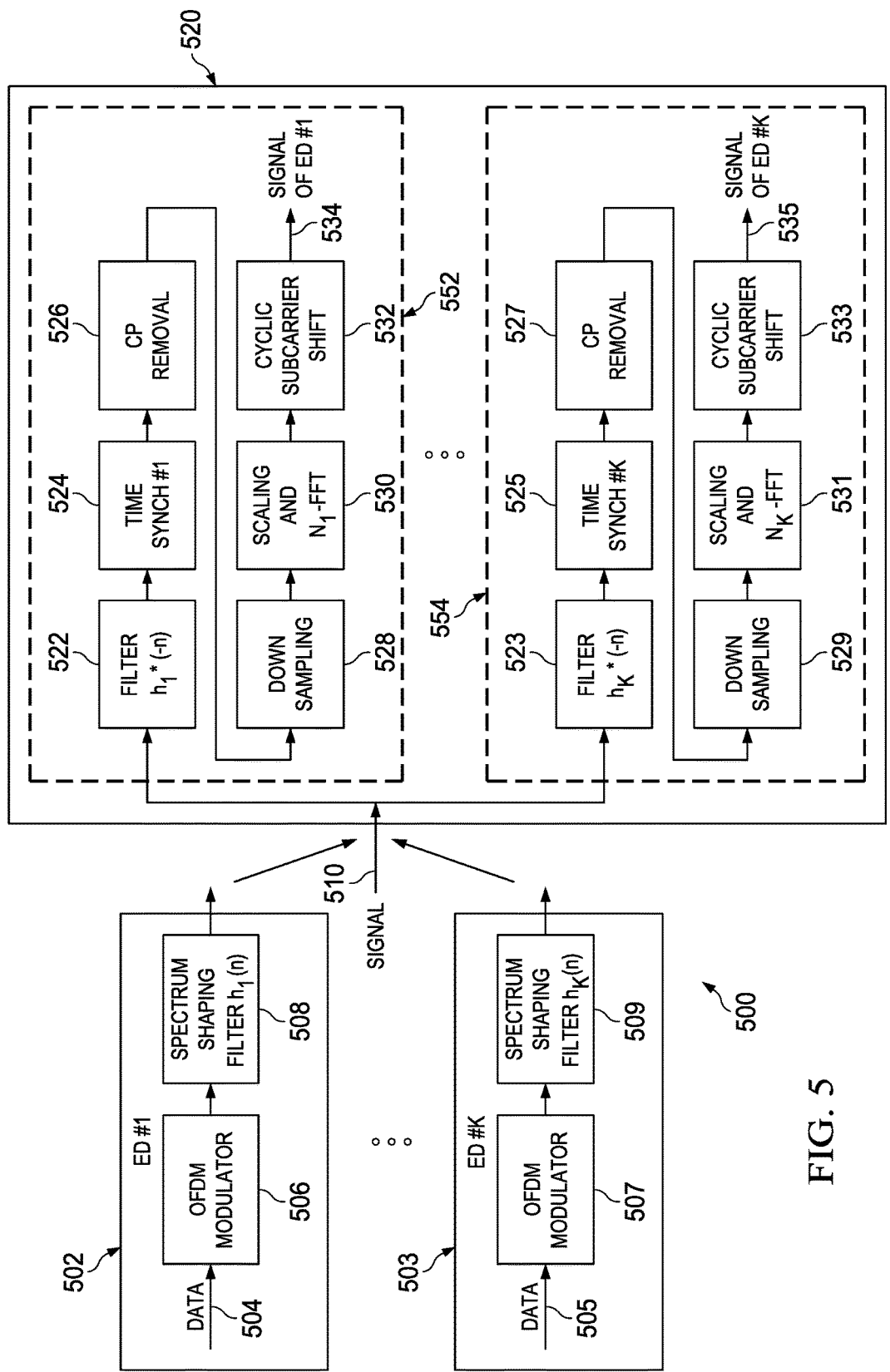
FIG. 5 illustrates a diagram of an embodiment wireless communication system.

FIG. 5 illustrates an embodiment wireless communication system 500. The system 500 includes a plurality of electronic devices (EDs) 502 to 503 (e.g., ED #1 to ED #K) and at least one receiver 520. In some embodiments, each electronic device 502, 503 may be an electronic device illustrated in FIG. 1, and the receiver 520 may be a base station illustrated in FIG. 1. The techniques described herein may be used for an asynchronous system in which the receiver 520 receives an asynchronous superposition of signals transmitted by the EDs 502, 503. The technique may also be used for a synchronous system in which the receiver 520 receives a synchronous superposition of signals transmitted by the EDs 502, 503.

The EDs 502, 503 may be assigned to communicate in different sub-bands of a frequency band of the system 500, and the different sub-bands may have different bandwidths. Each sub-band includes multiple subcarriers and may have different OFDM parameters, such as subcarrier spacing, and cyclic prefix length.

The EDs 502, 503 include a respective OFDM modulator 506, 507 configured to receive respective data 504, 505, and a respective spectrum shaping filter 508 (represented by $h_1(n)$), 509 (represented by $h_K(n)$). The data 504, 505 may be a modulation data sequence, and the OFDM modulators 506, 507 may include inverse IFFT blocks. The OFDM modulators 506, 507 may also include respective cyclic prefix (CP) generators (not shown).

During operation, each ED 502, 503 generates its modulated signal (which is the result of an IFFT operation on a modulation data sequence) corresponding to its assigned RBs at the OFDM modulator 506, 507. A modulated signal may be an OFDM signal, a discrete Fourier transform spread OFDM (DFTS-OFDM) signal, or other applicable signal.

Each ED 502, 503 then passes its modulated signal, e.g., an OFDM signal, to the spectrum shaping filter 508, 509, respectively. The spectrum shaping filter 508 or 509 may be configured to filter one or two edge band signals of a modulated signal, as discussed with respect to FIG. 4. The spectrum shaping filter 508 or 509 may also be configured to perform a time windowing operation on a center band signal of the modulated signal, as discussed with respect to FIG. 4. The filtered edge band signals and the time-windowed center band signal are then combined. The output of each of the spectrum shaping filter 508 or 509 is a filtered OFDM signal including one or more filtered edge band signals and a time-windowed center band signal.

The spectrum shaping filter 508 or 509 may be designed to eliminate a side lobe leakage of the modulated signal into signals communicated by other electronic devices in adjacent channels. For example, the spectrum shaping filters 508, 509 may be designed to provide sharp side lobe leakage elimination so that the electronic devices 502, 503 do not cause interference to each other during asynchronous transmissions. The spectrum shaping filter 508, 509 may also be designed to reduce or strongly attenuate side lobes of a modulated signal. A filtering operation performed by the spectrum shaping filter 508, 509 helps make a modulated signal of each ED localized in frequency, thus reducing the side lobe leakages. In one example when the EDs 502, 503 are assigned to communicate in consecutive sub-bands, the spectrum shaping filters 508, 509 may be designed to filter the OFDM signals generated by the EDs 502, 503, respectively, so that the filtered signals are localized to a certain level in assigned frequency bands, and the amount of interference that the EDs 502, 503 cause to each other may be negligible or reduced to a pre-determined level. In one embodiment, the spectrum shaping filter 508 or 509 may include a finite impulse response (FIR) filter or other suitable filter.

In one embodiment, the spectrum shaping filter 508 may include a filter that is centered at an edge band, such as the edge band corresponding to the edge band signal 410 or the edge band signal 430 in FIG. 4, of the OFDM signal output by the OFDM modulator 506. The filter is designed to attenuate or eliminate side lobes of an edge band signal corresponding to the edge band. The bandwidth of the filter may be set to be equal to the bandwidth of the edge band, and may include an additional null guard-band, such as the null guard-band 440 shown in FIG. 4. The filter may have a kernel that is about half of an OFDM symbol in length, which may help provide enough sharp roll-off to separate the OFDM signal from signals in neighboring channels. The filter may perform filtering on the OFDM signal at a sampling rate less than a sampling rate threshold. The output of the filter may then be filtered using an up-sampling filter and then a low-pass filter, as discussed above with respect to FIG. 4, generating a filtered edge band signal.

Similarly, the spectrum shaping filter 509 may include a filter that is centered at an edge band of the OFDM signal output by the OFDM modulator 507. The filter may have a bandwidth equal to the edge sub-band bandwidth, and may include an additional null guard-band. The kernel of the filter may have a length of about half of an OFDM symbol, which helps provide sharp roll-off to separate the OFDM signal from signals in neighboring resources. The output of the filter may be filtered using an up-sampling filter and then a low-pass filter, as discussed above with respect to FIG. 4, generating a filtered edge band signal.

Each ED 502, 503 may start a transmission of a filtered OFDM signal at any time, and it does not need to be synchronized to other EDs or the receiver 520 for transmission. The filtered OFDM signals transmitted by each of the EDs 502, 503 pass through communication channels and are received at the receiver 520.

A signal 510 that is received at the receiver 520 may include transmitted signals of OFDM signals transmitted by the EDs 502, 503. One or more such OFDM signals may be a filtered OFDM signal transmitted by ED 502 or 503, and includes one or more filtered edge band signal and a time-windowed center band signal. The receiver 520 includes K chains of operations corresponding to the K EDs 502, 503. Each chain of operations is configured to receive signals transmitted by a corresponding ED. In one embodiment, the operations of a chain may include filtering, time synchronization, CP removal, down sampling, FFT operation, and scaling and cyclic subcarrier shift. A chain may also include other operations that may be used to process received signals. As shown, each chain includes a plurality of functional blocks for performing the operations. For example, a first chain 552 corresponding to the ED #1 502 includes a filter 522, a time synchronization block 524, a CP removal block 526, a down sampling block 528, a scaling and $N_1$-point FFT block 530 and a cyclic subcarrier shift block 532. The $K^{th}$ chain 554 corresponds to the ED #K 503, and includes a filter 523, a time synchronization block 525, a CP removal block 527, a down sampling block 529, a scaling and $N_K$-point FFT block 531 and a cyclic subcarrier shift block 533. The output of each chain is a demodulated sequence of a signal transmitted by a corresponding ED. For example, the first chain outputs a demodulated sequence 534 of a signal transmitted by the ED 502, and the $K^{th}$ chain outputs a demodulated sequence 535 of a signal transmitted by the ED 503.

At the $i^{th}$ chain, the received signal 510 may first be passed to a filter represented by $h_i^*(-n)$, which is matched to a spectrum shaping filter used at a corresponding ED #i. A matched filtering performed by the filter is used to reduce or reject contributions of other EDs in the received signal 510. This may help reduce interference from neighboring EDs in an FFT operation in the $i^{th}$ chain. The matched filtering may also be used to generally maximize the received signal-to-noise ratio of the signals transmitted by ED #i.

As shown, at the first chain 552 corresponding to the ED #1 502, the received signal 510 is input into the filter 522 ($h_1^*(-n)$), which is matched to the spectrum shaping filter 508 used at ED #1 502. Similarly, at the $K^{th}$ chain 554 corresponding to the ED #K 503, the received signal 510 is input into a filter 523 ($h_K^*(-n)$), which is matched to the spectrum shaping filter 509 used at ED #K 503.

The receiver 520 needs to know when transmissions from the EDs 502, 503 occur for receiving the transmissions correctly. Each of the chains performs a per-ED time synchronization at a time synchronization block to synchronize a received signal with a transmitted signal from a ED. For example, after the filtering operation by the filter $h_i^*(-n)$ of the $i^{th}$ chain, an operational window may be shifted so that it is to be time-synchronized to the corresponding ED #i. In one embodiment, a shift for shifting the operational window may include a transmission delay of the ED #i. The shift may also include an aggregate delay of an end-to-end filter $g_i(n) \triangleq h_i(n) * h_i^*(-n)$. The aggregate delay may be a delay of the strongest tap of the end-to-end filter, which is typically its middle tap. In this case, the beginning and end tails of a time-synchronized signal due to the end-to-end filter $g_i(n)$, is truncated. With the time synchronization operation, signals corresponding to synchronized OFDM symbols may be output for further processing.

As shown, the first chain 552 performs time synchronization at the time synchronization block 524. An output of the filter 522 is fed into the time synchronization block 524, and a delay compensated signal is then obtained by shifting an operational window to be time-synchronized to the corresponding ED 502. The shift is determined based on a transmission delay of the ED #1 502, and an aggregate delay of an end-to-end filter $g_1(n) \triangleq h_1(n)*h_1^*(-n)$. The delay compensated signal may then be divided into OFDM symbols, and a CP is removed from each OFDM symbol by the CP removal block 526. Similarly, the $K^{th}$ chain performs time synchronization at the time synchronization block 525. At the output of the time synchronization block 525, a delay compensated signal is obtained by shifting an operational window to be time-synchronized to the corresponding ED #K 503. The shift may include a delay of the ED #K 503, and may also include an aggregate delay of an end-to-end filter $g_K(n) \triangleq h_K(n)*h_K^*(-n)$. The delay compensated signal is then divided into OFDM symbols, and a CP is removed from each OFDM symbol by the CP removal block 527.

The operations of the $i^{th}$ chain may further include a down sampling operation that is performed at a down sampling block. The down sampling operation may be performed on a portion of an OFDM signal transmitted by ED #i separately from other portions of the OFDM signal. For example, a down sampling operation may be performed on an edge band signal of the OFDM signal transmitted by ED #i. Because the edge band signal corresponds to a less bandwidth, the edge band signal can be down-sampled at a sampling rate lower that a sampling rate required for the OFDM signal. Down-sampling the edge band signal helps reduce processing complexity of the edge band signal.

An OFDM symbol may be down sampled with a factor of N/Ni, where N is the FFT size for OFDM symbols of each ED, and $N_i<N$ is the number of samples after down sampling. In one example, $N_i \triangleq 2[\log_2 M_i]$, and $M_i$ is the number of subcarriers assigned to the ED #i. After the down sampling operation, each OFDM symbol has Ni samples, instead of N sample. The down sampling factor is chosen to satisfy the Nyquist sampling criterion for reconstruction. $N_i$ may be set to be a number of a power of 2 in order to facilitate a subsequent FFT operation. As shown in FIG. 5, the down sampling operation for the first chain 552 is performed by the down sampling block 528, and the down sampling operation for the $K_{th}$ chain 554 is performed by the down sampling block 529.

The operations of the $i^{th}$ chain may also include a scaling operation for accounting for the down sampling effect. The scaling operation is performed on a down-sampled signal, generating a scaled signal, which then be transformed into the frequency domain. Each OFDM symbol of the scaled signal is transformed to the frequency domain using a $N_i$-point FFT operation. The $N_i$-point FFT operation requires a reduced complexity for performing FFT because the scaled signal is a down-sampled signal. As shown in FIG. 5, the operations of the first chain 552 include scaling of a down sampled signal to account for a down sampling effect and an FFT operation on the scaled signal, which are performed at the scaling and $N_1$-point FFT block 530. Similarly, the operations of the $K^{th}$ chain 554 include scaling of a down sampled signal to account for a down sampling effect and an FFT operation on the scaled signal, which are performed at the scaling and $N_K$-point FFT block 531.

The operations of the $i_{th}$ chain further include a cyclic subcarrier shift operation that is performed at a cyclic subcarrier shift block to account for down sampled signals. As shown, the first chain 552 performs a cyclic subcarrier shift operation at the cyclic subcarrier shift block 532. Similarly, the $K_{th}$ chain 554 performs a cyclic subcarrier shift operation at the cyclic subcarrier shift block 533. The cyclic subcarrier shift places the down-sampled signal back to its correct spectrum.

FIG. 5 illustrates one example of the communication system 500 that include components or elements in a certain arrangement as shown; however, one of ordinary skill in the art would recognize that various changes may be made to the communication system 500. For example, various components of the communication system 500 may be combined, further sub-divided, moved, or omitted, and additional components may be added according to particular needs. Some of the components of the communication system 500 may also be arranged in a different order. For example, the time synchronization block 524 may be placed before the filter 522. The system 500 may include any number of each component shown in FIG. 5.

Figure 6:
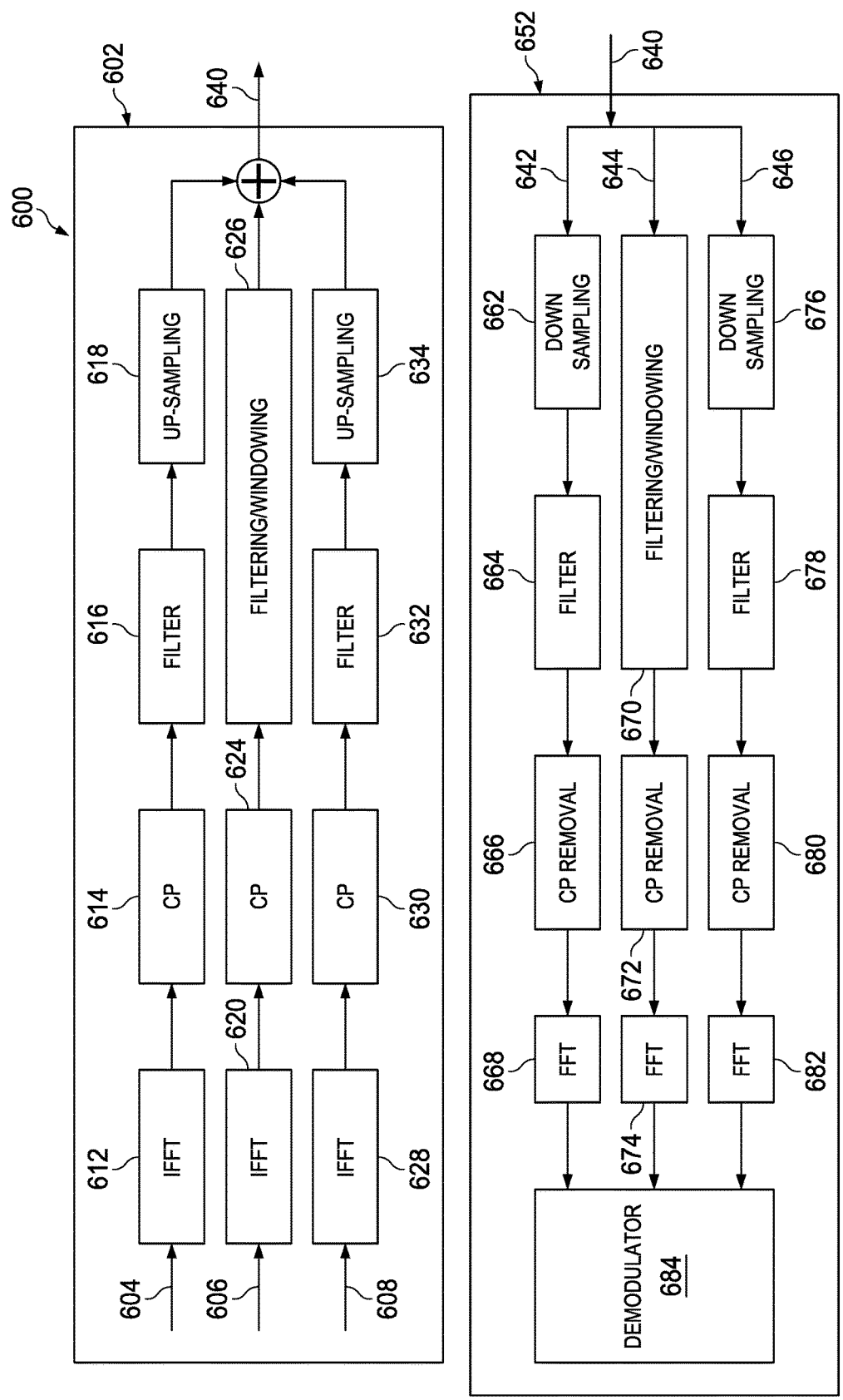
FIG. 6 illustrates a diagram of another embodiment wireless communication system.

FIG. 6 illustrates another embodiment communication system 600, where OFDM signals are filtered at a reduce complexity and transmitted to a receiver. The system 600 includes a transmitter 602 and a receiver 652. The transmitter 602 generates an OFDM signal over a frequency band (or subband). The OFDM signal carries data sequences that are modulated onto the frequency band. The OFDM signal includes first edge band signal corresponding to a first edge band of the frequency band, a second edge band signal corresponding to a second edge band of the frequency band, and a center band signal corresponding to a center band of the frequency band. The first edge band, the second edge band and the center band have the same numerology. In this example, a 2048-point FFT is used to generate the OFDM signal, and the OFDM signal includes 100 RBs. The center band signal may include 92 RBs, and each of the two edge band signals may occupy 4 RBs.

The transmitter 602 processes the OFDM signal to generate a filtered OFDM signal 640 for transmission. In one embodiment, the first edge band signal, the second edge band signal and the center band signal are processed separately and then combined. Specifically, the first edge band signal and the second edge band signal are filtered at a lower sampling rate to attenuate side lobes of the edge band signals, as discussed above with respect to FIG. 4 and FIG. 5.

As shown, the first edge band signal may be processed by an IFFT block 612, a CP block 614, a filter 616 and an up-sampling block 618. OFDM symbols 604 corresponding to the first edge band signal are input into the IFFT block 612 where IFFT is performed on the first edge band signal. Because the first edge band signal occupies a less bandwidth then the OFDM signal, a smaller number of points may be used to perform the IFFT operation on the first edge band signal. For example, the IFFT block 612 performs a 128-point IFFT. The output of the IFFT block 612 is thus a signal that has a sampling rate less than the OFDM signal. The CP block 614 adds CPs in the symbols output from the IFFT block 612. The filter 616 performs filtering on the CP-added symbols output from the CP block 614 at the lower sampling rate that is less than the OFDM signal. For example, the filter 616 may only have 65 taps. The filter 616 may attenuate side lobes of the first edge band signal, as discussed above with respect to FIG. 4. The filter 616 generates a first filtered edge band signal, which is then up-sampled at the up-sampling block 618 so that the first filtered edge band signal is converted into a filtered edge band signal with the same sampling rate as the OFDM signal. The up-sampling ratio may be 16.

The second edge band signal may be processed similarly to the first edge band signal. As shown, symbols 608 corresponding to the second edge band signal are passed through an IFFT block 628, a CP block 630, a filter 632 and an up-sampling block 634, where a second filtered edge band signal is generated. These blocks function similarly to the IFFT block 612, the CP block 614, the filter 616 and the up-sampling block 618.

The center band signal is processed by an IFFT block 620, a CP block 624 and a filtering/windowing block 626. The IFFT block 620 performs a 2048-point IFFT on OFDM symbols 606 corresponding to the center band signal. The CP block 624 adds CPs in the symbols output from the IFFT block 620. The filtering/windowing block 626 performs filtering or time windowing operation on the CP-added symbols, and generates a filtered or time-windowed center band signal. The first filtered edge band signal, the second filtered edge band signal, and the filtered or time-windowed center band signal are then combined into a filtered OFDM signal 640 and transmitted.

When receiving the transmitted OFDM signal 640, the receiver 652 processes the first filtered edge band signal 642, the second filtered edge band signal 646, and the filtered or time-windowed center band signal 644 separately. In one embodiment, the first filtered edge band signal 642 is processed by a down sampling block 662, a filter 664, a CP removal block 666 and an FFT block 668. The down sampling block 662 down-samples the first filtered edge band signal at a down-sampling ratio of 16. The filter 664 performs a filtering operation on the first filtered edge band signal that has been down-sampled. In this example, the filter 664 has 65 taps. The CP removal block 666 removes CPs from OFDM symbols that are output from the filter 664, and the FFT block 668 performs a 128-point FFT on the CP-removed OFDM symbols.

The second filtered edge band signal 646 is processed by a down sampling block 676, a filter 678, a CP removal block 680 and an FFT block 682. These blocks function similarly to the down sampling block 662, the filter 664, the CP removal block 666 and the FFT block 668 that are used to process the first filtered edge band signal.

The filtered or time-windowed center band signal 644 is processed by a filtering/windowing block 670, a CP removal block 672 and an FFT block 674. The filtering/windowing block 670 performs filtering or time windowing operation on the filtered or time-windowed center band signal. The CP removal block 672 removes CPs from the output of the filtering/windowing block 670, and the FFT block 674 performs a 2048-point FFT on the CP-removed symbols output from the CP removal block 672.

The OFDM symbols output from the FFT blocks 668, 674 and 682 are then combined and fed into a demodulator 684. These OFDM symbols occupy 100 RBs. The demodulator 684 performs demodulations on these OFDM symbols and obtains the data sequences carried in the filtered OFDM signal sent by the transmitter 602.

Figure 7:
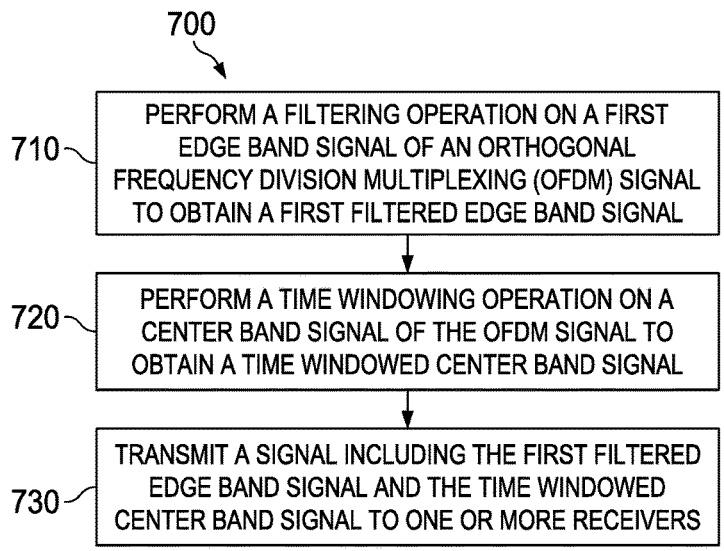
FIG. 7 illustrates a flowchart of an embodiment method for transmitting a filtered OFDM (f-OFDM) signal.

FIG. 7 illustrates a flowchart of an embodiment method 700 for transmitting an f-OFDM signal, as may be performed by a transmitter of a device. The device may be an ED or a base station. At step 710, the transmitter performs a filtering operation on a first edge band signal of an OFDM signal to obtain a first filtered edge band signal. The OFDM signal may be a sub-band signal or a system band signal. A bandwidth of the OFDM signal may include three frequency bands that include a first edge frequency band, a second edge frequency band and a center frequency band between the first edge frequency band and the second edge frequency band. The OFDM signal includes the first edge band signal corresponding to the first edge frequency band, and a center band signal corresponding to the center frequency band. The first or the second edge band signal may include exactly three RBs, exactly four RBs, or exactly five RBs.

The first edge band signal may be filtered using a high-order filter at a sampling rate that is less than a sampling rate threshold. The sampling rate threshold may be less than twice the bandwidth of the OFDM signal or the center band signal in Hertz. The first edge band signal may be filtered using a pass-band filter. The pass-band filter may have an edge band filter mask that is at least one RB wider than a number of RBs included in the first edge band signal. The filtering operation may be performed on the first edge band signal so that side lobes of the first edge band signal that is outside of a frequency band allocated to the transmitted signal for transmission is attenuated.

At step 720 the transmitter performs a time windowing operation on the center band signal to obtain a time-windowed center band signal. At step 730, the transmitter transmits a signal that includes the first filtered edge band signal and the time-windowed center band signal to one or more receivers.

The OFDM signal may also include a second edge band signal corresponding to the second edge frequency band. The transmitter may perform a filtering operation on the second edge band signal to generate a second filtered edge band signal, and transmit the second filtered edge band signal. In one embodiment, the filtering operation on the first edge band signal and the filtering operation on the second edge band signal are performed so that interference between the transmitted signal and a second transmitted signal is reduced, where the transmitted signal is allocated for transmission a first band, the second transmitted signal is allocated a second band for transmission, and the first band is adjacent to the second band in the frequency domain.

Prior to step 730, the transmitter may combine the first filtered edge band signal, the second filtered edge band signal and the windowed center band signal to obtain an aligned spectrum contained OFDM signal, which includes the first filtered edge band signal, the second filtered edge band signal and the time-windowed center band signal that are aligned in the frequency domain as the first edge band signal, the second edge band signal and the center band signal.

Figure 8:
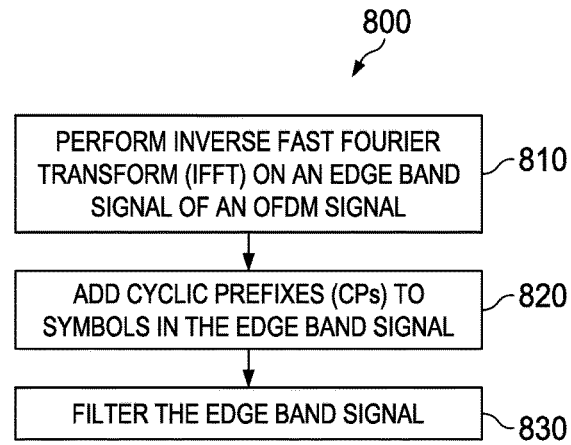
FIG. 8 illustrates a flowchart of an embodiment method for filtering an edge band signal of an OFDM signal.

FIG. 8 illustrates a flowchart of an embodiment method 800 for filtering an edge band signal of an OFDM signal, as may be performed by a transmitter. At step 810, the transmitter performs inverse fast Fourier transform (IFFT) on the edge band signal to transform the edge band signal from the frequency domain to the time domain. At step 820, the transmitter adds CPs to symbols in the edge band signal in the time domain. At step 830, the transmitter filters the edge band signal with added CPs to attenuate outer-most side lobes of the edge band signal. The filtering may be performed as discussed above with respect to FIG. 4 and FIG. 5.

Figure 9:
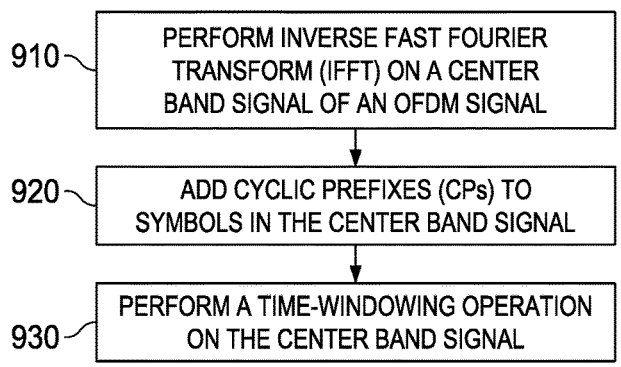
FIG. 9 illustrates a flowchart of an embodiment method for performing a time windowing operation on a center band signal of an OFDM signal.

FIG. 9 illustrates a flowchart of an embodiment method 900 for performing a time windowing operation on a center band signal of an OFDM signal, as may be performed by a transmitter. At step 910, the transmitter performs IFFT on the center band signal to transform the center band signal from the frequency domain to the time domain. At step 920, the transmitter adds CPs to symbols of the center band signal in the time domain. At step 930, the transmitter performs a time windowing operation on the center band signal with added CPs in the time domain.

Figure 10:
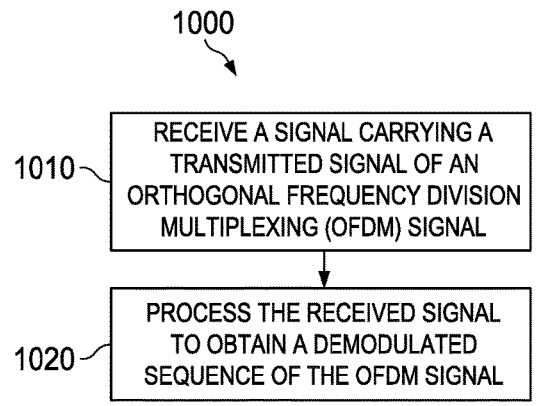
FIG. 10 illustrates a flowchart of an embodiment method for receiving a signal.

FIG. 10 illustrates a flowchart of an embodiment method 1000 for receiving a signal, as may be performed by a receiver. At step 1010, the receiver receives a signal carrying a transmitted signal of an orthogonal frequency-division multiplexing (OFDM) signal that is transmitted by a transmitter. The transmitted signal includes a first filtered edge band signal and a time-windowed center band signal of the OFDM signal. The first filtered edge band signal corresponds to a first edge band of a bandwidth of the OFDM signal, and the time-windowed center band signal corresponds to a center band of the bandwidth of the OFDM signal. The center band is positioned between the first edge band and a second edge band of the bandwidth of the OFDM signal.

At step 1020, the receiver processes the received signal to obtain a demodulated sequence of the OFDM signal. The receiver may process the received signal by performing a filtering operation on the received signal to obtain the transmitted signal of the OFDM signal. The receiver may process the received signal by performing time synchronization with the transmitted signal of the OFDM signal. The receiver may also process the received signal by performing a down-sampling operation on the first filtered edge band signal in the obtained transmitted signal, where the first filtered edge band signal is sampled at a sampling rate that is less than a sampling rate of the OFDM signal. The down-sampling operation on the first filtered edge band signal generates a first down-sampled edge band signal. The receiver may perform a fast Fourier transform (FFT) operation on the first down-sampled edge band signal, and perform a cyclic subcarrier shift operation after the FFT operation.

Figure 11:
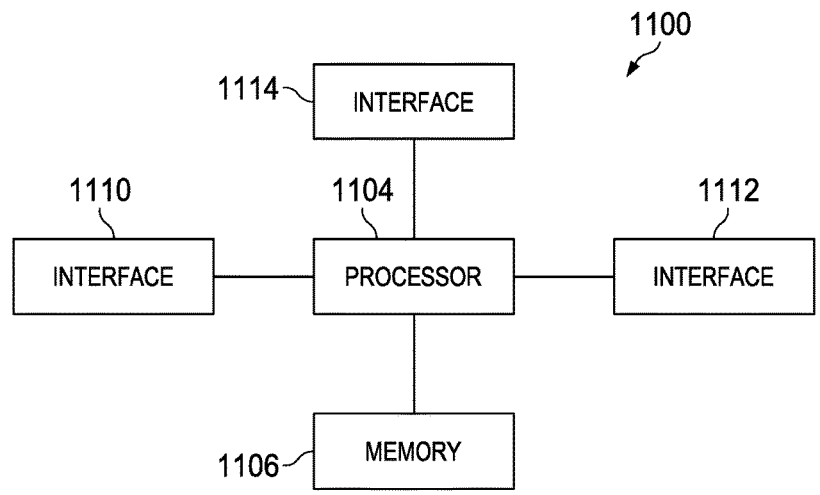
FIG. 11 illustrates a diagram of an embodiment processing system.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
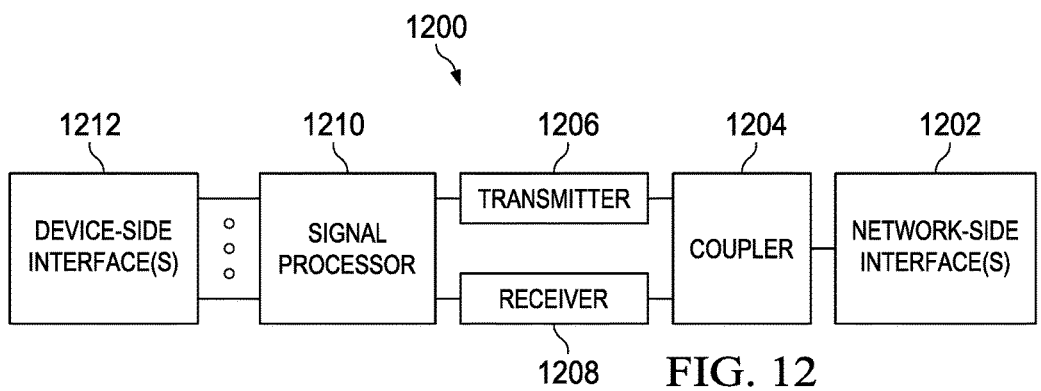
FIG. 12 illustrates a diagram of an embodiment transceiver.

In some embodiments, one or more of the interfaces 1110, 1112, 1114 connects the processing system 1100 to a transceiver adapted to transmit and receive signaling over the telecommunications network. FIG. 12 illustrates a block diagram of an embodiment transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a performing unit/module, a combining unit/module, a filtering unit/module, a sampling unit/module, a modulating unit/module, a demodulating unit/module, a time synchronizing unit/module, a FFT/IFFT unit/module, and/or a time windowing unit/module. The respective units/modules may be hardware, software, or a combination thereof. For instance, one or more of the units/modules may be an integrated circuit, such as field programmable gate arrays (FPGAs) or application-specific integrated circuits (ASICs).

The following U.S. Patent Applications are incorporated by reference herein as if reproduced in their entireties: U.S. patent application Ser. No. 14/231,217; U.S. patent application Ser. No. 14/821,575; U.S. patent application Ser. No. 14/836,538; U.S. patent application Ser. No. 14/960,167; U.S. patent application Ser. No. 14/180,147; U.S. patent application Ser. No. 15/146,735; and U.S. patent application Ser. No. 15/161,023.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for wireless communications, the method comprising:
    performing, by a device, a filtering operation on a first edge band signal of an orthogonal frequency-division multiplexing (OFDM) signal, thereby generating a first filtered edge band signal, wherein a bandwidth of the OFDM signal comprises a first edge frequency band, a second edge frequency band and a center frequency band between the first edge frequency band and the second edge frequency band, and wherein the OFDM signal comprises the first edge band signal corresponding to the first edge frequency band and a center band signal corresponding to the center frequency band;
    performing, by the device, a time windowing operation on the center band signal, thereby generating a time-windowed center band signal; and
    transmitting, by the device, a signal comprising the first filtered edge band signal and the time-windowed center band signal to one or more receivers.

2. The method of claim 1, wherein the filtering operation on the first edge band signal is performed so that side lobes of the first edge band signal that are outside of a frequency, band allocated to the OFDM signal is attenuated.

3. The method of claim 1, wherein:
    the OFDM signal further comprises a second edge band signal corresponding to the second edge frequency band; and the method further comprises
    performing a filtering operation on the second edge band signal, thereby generating a second filtered edge band signal, wherein the signal further comprises the second filtered edge band signal.

4. The method of claim 3, wherein transmitting the signal comprising the first filtered edge band signal, the time-windowed center band signal, and the second filtered edge band signal to one or more receivers comprises:
    combining the first filtered edge band signal, the second filtered edge band signal and the time-windowed center band signal to obtain a combined OFDM signal, wherein the first filtered edge band signal, the second filtered edge band signal and the time-windowed center band signal are aligned in the same position in the frequency domain as the first edge band signal, the second edge band signal and the center band signal; and
    transmitting the combined OFDM signal to the one or more receivers.

5. The method of claim 1, wherein performing the filtering operation on the first edge band signal comprises:
    filtering the first edge band signal using a filter at a sampling rate that is less than a sampling rate threshold.

6. The method of claim 5, wherein the sampling rate threshold is less than twice the bandwidth of the OFDM signal in Hertz.

7. The method of claim 1, wherein performing the filtering operation on the first edge band signal comprises filtering the first edge band signal using a pass-band filter, the pass-band filter having an edge band filter mask that is at least one resource block (RB) wider than a number of RBs included in the first edge band signal.

8. The method of claim 1, further comprising:
    performing an up-sampling operation on the first filtered edge band signal to obtain an up-sampled filtered edge band signal prior to transmitting the signal to the one or more receivers, wherein the first filtered edge band signal in the transmitted signal comprises the up-sampled filtered edge band signal.

9. The method of claim 1, wherein the first edge band signal comprises exactly three resource blocks (RBs), exactly four RBs, or exactly five RBs.

10. The method of claim 1, wherein the OFDM signal is a sub-band signal or a system band signal.

11. The method of claim 1, wherein the filtering operation is different from the time windowing operation, and the center frequency band is between the first edge frequency band and the second edge frequency band in the frequency domain.

12. A device comprising:
    a non-transitory memory storage comprising instructions; and
    one or more processors in communication with the non-transitory memory storage, wherein the one or more processors execute the instructions to:
        perform a filtering operation on a first edge band signal of an orthogonal frequency-division multiplexing (OFDM) signal, thereby generating a first filtered edge band signal, wherein a bandwidth of the OFDM signal comprises a first edge frequency band, a second edge frequency band and a center frequency band positioned between the first edge frequency band and the second edge frequency band, and wherein the OFDM signal comprises the first edge band signal corresponding to the first edge frequency band, and a center band signal corresponding to the center frequency band;

perform a time windowing operation on the center band signal, thereby generating a time-windowed center band signal; and transmit a signal comprising the first filtered edge band signal and the time-windowed center band signal to one or more receivers.

13. The device of claim 12, wherein the filtering operation on the first edge band signal is performed so that side lobes of the first edge band signal that are outside of a frequency band allocated to the OFDM signal is attenuated.

14. The device of claim 12, wherein;

the OFDM signal further comprises a second edge band signal corresponding to the second edge frequency band; and the one or more processors execute the instructions further to perform a filtering operation on the second edge band signal, thereby generating a second filtered edge band signal, wherein the signal further comprises the second filtered edge band signal.

15. The device of claim 14, wherein transmit the signal comprises:

combining the first filtered edge band signal, the second filtered edge band signal and the time-windowed center band signal to obtain a combined OFDM signal, wherein the first filtered edge band signal, the second filtered edge band signal and the time-windowed center band signal are aligned in a same spectrum as the first edge band signal, the second edge band signal and the center band signal; and transmitting the combined OFDM signal to the one or more receivers.

16. The device of claim 12, wherein the filtering operation on the first edge band signal is performed by filtering the first edge band signal using a high-order filter at a sampling rate that is less than a sampling rate threshold.

17. A method for wireless communications, the method comprising:

receiving, by a device, a first signal;

performing a filtering operation on the first signal to obtain an orthogonal frequency-division multiplexing (OFDM) signal comprising a first filtered edge band signal and a time-windowed center band signal, wherein the first filtered edge band signal corresponds to a first edge frequency band of a bandwidth of the OFDM signal, and the time-windowed center band signal corresponds to a center frequency band of the bandwidth of the OFDM signal, the center frequency band is positioned between the first edge frequency band and a second edge frequency band of the bandwidth of the OFDM signal;

performing a down-sampling operation on the first filtered edge band signal in the OFDM signal without down-sampling the time-windowed center band signal in the OFDM signal, thereby generating a first down-sampled edge band signal, wherein the first filtered edge band signal is sampled at a sampling rate that is less than a sampling rate of the time-windowed center band signal after the performing the down-sampling operation; and performing a fast Fourier transform (FFT) operation on the first down-sampled edge band signal.

18. The method of claim 17, further comprising:

performing a cyclic subcarrier shift on a signal obtained after the FFT operation performed on the first down-sampled edge band signal.

19. The method of claim 17, further comprising:

performing a time synchronization operation to synchronize the first signal to the OFDM signal.

20. The method of claim 17, wherein the OFDM signal further comprises a second filtered edge band signal corresponding to the second edge frequency band.

21. The method of claim 20, further comprising:

performing a down-sampling operation on the second filtered edge band signal in the OFDM signal, thereby generating a second down-sampled edge band signal, wherein the second filtered edge band signal is sampled at a sampling rate that is less than the sampling rate of the OFDM signal.

22. The method of claim 21, further comprising:

performing a fast Fourier transform (FFT) operation on the second down-sampled edge band signal.

* * * * *